US011358278B2

(12) United States Patent
Krautwurm

(10) Patent No.: US 11,358,278 B2
(45) Date of Patent: Jun. 14, 2022

(54) METHOD FOR COLLISION DETECTION AND AUTONOMOUS SYSTEM

(71) Applicant: Siemens Aktiengesellschaft, Munich (DE)

(72) Inventor: Florian Krautwurm, Munich (DE)

(73) Assignee: SIEMENS AKTIENGESELLSCHAFT, Munich (DE)

(*) Notice: Subject to any disclaimer, the term of this patent is extended or adjusted under 35 U.S.C. 154(b) by 354 days.

(21) Appl. No.: 16/327,613

(22) PCT Filed: Jul. 4, 2017

(86) PCT No.: PCT/EP2017/066562
§ 371 (c)(1),
(2) Date: Feb. 22, 2019

(87) PCT Pub. No.: WO2018/036699
PCT Pub. Date: Mar. 1, 2018

(65) Prior Publication Data
US 2019/0184563 A1    Jun. 20, 2019

(30) Foreign Application Priority Data
Aug. 24, 2016 (EP) ..................... 16185493

(51) Int. Cl.
*B25J 9/16* (2006.01)

(52) U.S. Cl.
CPC ........... *B25J 9/1676* (2013.01); *B25J 9/1671* (2013.01); *G05B 2219/39082* (2013.01);
(Continued)

(58) Field of Classification Search
CPC .................. B25J 9/1676; B25J 9/1671; G05B 2219/39094; G05B 2219/39082;
(Continued)

(56) References Cited

U.S. PATENT DOCUMENTS

2003/0225479 A1    12/2003    Waled
2011/0066282 A1*    3/2011    Bosscher ............... B25J 9/1676
                                                              700/248

(Continued)

FOREIGN PATENT DOCUMENTS

CN    101512453 A    8/2009
EP      1901150 A1    3/2008
(Continued)

OTHER PUBLICATIONS

PCT International Search Report and Written Opinion of International Searching Authority dated Sep. 5, 2017 corresponding to PCT International Application No. PCT/EP2017/066562 filed Jul. 4, 2017.
(Continued)

*Primary Examiner* — Basil T. Jos
(74) *Attorney, Agent, or Firm* — Schmeiser, Olsen & Watts LLP

(57) ABSTRACT

Provided is a method for detecting an imminent collision between an object and a component of an autonomous system in the real environment including at least one real, decentralized autonomous component, whereby of at least a part of the autonomous system a virtual image is available, emulating at least one aspect of the autonomous system.

17 Claims, 3 Drawing Sheets

Figure 4:
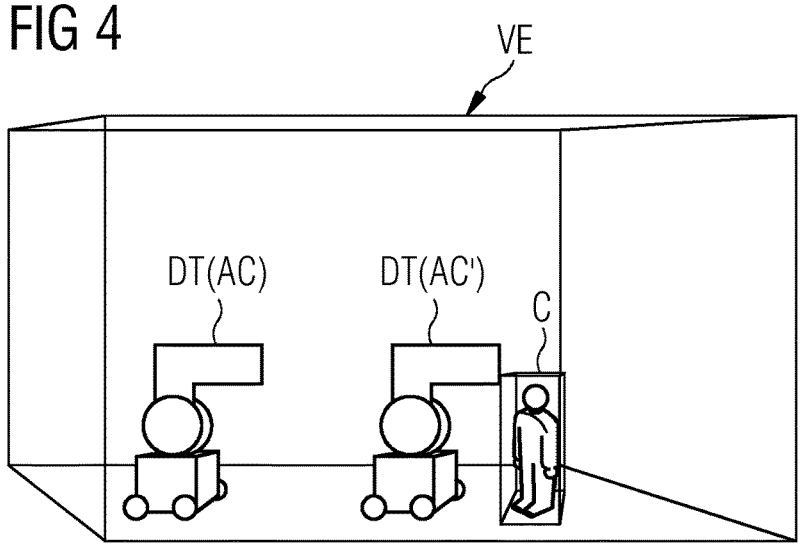

(52) U.S. Cl.
CPC .............. *G05B 2219/39091* (2013.01); *G05B 2219/39094* (2013.01); *G05B 2219/40201* (2013.01); *G05B 2219/40202* (2013.01); *G05B 2219/40203* (2013.01); *G05B 2219/40311* (2013.01); *G05B 2219/40317* (2013.01)

(58) Field of Classification Search
CPC ........... G05B 2219/39091; G05B 2219/40201; G05B 2219/40202; G05B 2219/40203; G05B 2219/40311; G05B 2219/40317
See application file for complete search history.

(56) References Cited

U.S. PATENT DOCUMENTS

| | | | |
|---|---|---|---|
| 2013/0178980 A1 | 7/2013 | Chemouny et al. | |
| 2016/0016315 A1* | 1/2016 | Kuffner, Jr | B25J 9/1676 700/255 |
| 2019/0105779 A1* | 4/2019 | Einav | B25J 9/1697 |

FOREIGN PATENT DOCUMENTS

| | | |
|---|---|---|
| WO | 2007093413 A1 | 8/2007 |
| WO | 2015120008 A1 | 8/2015 |

OTHER PUBLICATIONS

European Search Report for application No. 16185493.0 dated Feb. 28, 2017.

Corrales, J.A., et al., "Safe human-robot interaction based on dynamic sphere-swept line bounding volumes," Robotics and Computer-Integrated Manufacturing; vol. 27; Issue 1; 2011; pp. 177-185; XP027436087; ISSN 0736-5845; https://doi.org/10.1016/j.rcim2010.07.005. 9 pages.

Balan, L., et al., "Real-team 3D Collision Avoidance Method for Safe Human and Robot Coexistence," 2006 IEEE/RSJ International Conference on Intelligent Robots and Systems; 2006; pp. 276-282; XP03i006532; DOI: 10.1109/IROS.2006.282068; 7 pages.

Gottschalk, S., et al., "OBBTree: a hierarachical structure for rapid interference detection," In Proceedings of the 23rd Annual Conference on Computer Graphics and Interactive Techniques (SIGGRAPH 96); 1996; Association for Computing Machinary, New York, NY, USA; pp. 171-180: DOI: https://doi.org/10.1145/237170.237244; XP000682733 10 pages.

Martinez-Salvador, B., et al., "A hierarchy of detail for fast collision detection," Proceedings. 2000 IEEE/RSJ International Conference on Intelligent Robots and Systems (IROS 2000); (Cat. No. 00CH37113); 2000; pp. 745-750; vol. 1; DOI: 10.1109/IROS2000.894693; XP032883288; 6 pages.

Cifuentes, Carlos A., et al., "Human-robot interaction based on wearable IMU sensor and laser range finder," Robotics and Autonomous Systems; vol. 62; Issue 10; 2014; pp. 1425-1439; ISSN 0921-8890; https://doi.org/10.1016/j.robot.2014.06.001; XP029043450; 15 pages.

Grzonka, S., "Mapping indoor environments based on human activity," 2010 IEEE International Conference on Robotics and Automation; 2010; pp. 476-481; doi: 10.1109/ROBOT.2010.5509976; XP031743909; 6 pages.

Examination Report in related European Patent Application No. 17734744.0 dated Jun. 18, 2021. 11 pages.

* cited by examiner

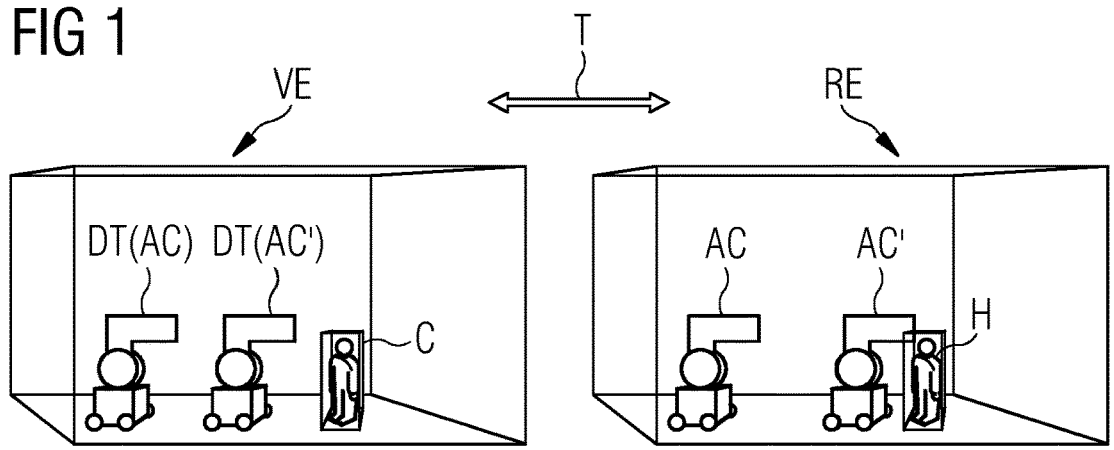
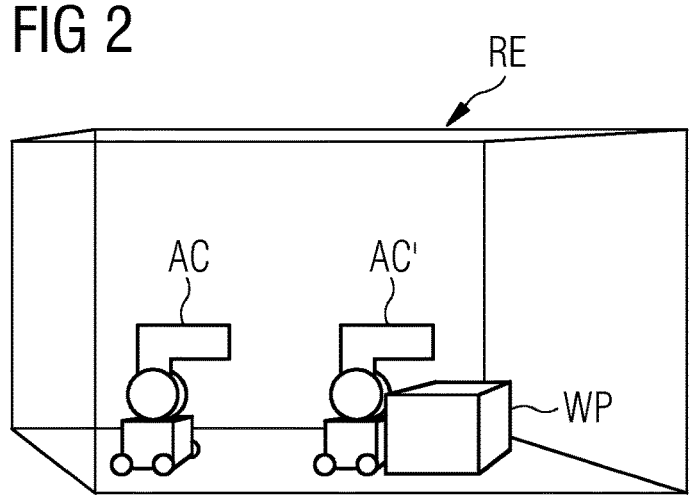
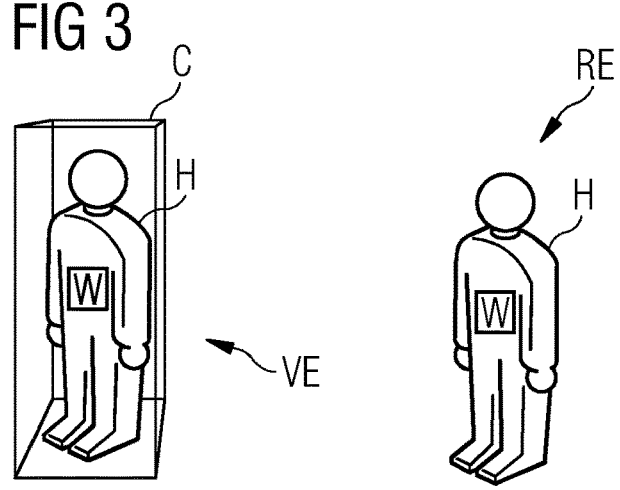

METHOD FOR COLLISION DETECTION AND AUTONOMOUS SYSTEM

CROSS-REFERENCE TO RELATED APPLICATIONS

This application claims priority to PCT Application No. PCT/EP2017/066562, having a filing date of Jul. 4, 2017, which is based on European Application No. 16185493.0, having a filing date of Aug. 24, 2016, the entire contents both of which are hereby incorporated by reference.

FIELD OF TECHNOLOGY

The following relates to a method for collision detection and an autonomous system.

BACKGROUND

In industrial manufacturing there is a tendency from traditional, centralized systems to autonomous, distributed systems. Autonomous distributed systems comprise components, e.g. robots, which are not controlled by a central instance and have a certain degree of autonomy for their actions.

Moreover, traditional equipment is used in combination with new technologies such as intelligent robots, CNC machines, 3D printers and other smart devices, which have an interface to a virtual simulation or/and emulation environment. Hence, interaction between the real world and a virtual image thereof can be provided. A term used therefore for these manufacturing systems is Cyber-physical production system.

For planning, testing and operating of these systems a concept is used where for the real or physical factory there is a virtual, digital copy reflecting certain aspects of a certain component or group of components. This virtual digital copy is sometimes referred to as digital twin and the virtual, digital copy on the IT platform, where it is running is often referred to as "digital factory".

The underlying idea is to explore or control the behavior of some or all components of the physical factory without having to actually run the procedure on the physical components.

In these autonomous, distributed systems often there is cooperation between the autonomous components, e.g. robots, and human co-workers. However, this bears the danger that not only collision between the components might occur but also that human co-workers are injured by the autonomous components.

SUMMARY

An aspect relates to avoiding collisions in an autonomous, distributed production system.

The embodiments of the invention relate to a method for detecting an imminent collision between an object and a component of an autonomous system in the real environment comprising at least one real, decentralized autonomous component.

For at least a part of the autonomous system a virtual image is available which emulates at least one aspect of the autonomous system.

For example, the virtual image is set up as a duplicate of the autonomous system running on a computer that provides the processing power. Input to that duplicate may comprise e.g. the architecture, hardware or data stemming e.g. from sensors of the real factory. Duplicate is not to be understood that there is an exact copy showing every single detail of the autonomous system. Preferably certain aspects of an autonomous system are emulated in the virtual image with the help of the processing power of the computer the virtual image is running.

The method comprises a step of transferring of data to the virtual image of the autonomous system. Said data comprise component data that provide information in relation to a movement of the at least one real autonomous component and object data that provide information in relation to a movement of the object.

In the virtual image of the autonomous system a corpus around the virtual image of the object—i.e. the digital twin of the object—is generated which defines a volume that cannot be entered by the at least one autonomous component.

Preferably that corpus is of the shape of a box or parallepiped. This reduces computational efforts.

The component data and the object data are processed in the virtual image and feedback data are generated which provide information about the movements of the object and the autonomous component.

For example, the computer the virtual image is running on provides the computational power to simulate future movements by starting from the data transferred to the virtual image and then by use of a movement model or e.g. in the case of a linear motion by a simple extrapolation considering direction, velocity and the time passed until the feedback data are available at the real or physical autonomous component or unit.

These feedback data are transmitted from the virtual image of the autonomous system to the real autonomous component.

Preferably the feedback data comprise data about future situations which have been simulated in the virtual image in particular by use of models of movements of a specific autonomous component or/and object.

The autonomous component considers the feedback data for decisions about a further movement. In particular it may initiate a movement in order to avoid a collision.

According to an advantageous embodiment the corpus around the object or/and at least on autonomous component is variable in dependence on the direction and size of the velocity of the object or/and the autonomous component. In the example of a corpus of the form of a box the box's edges are prolonged in the direction of the movement. The actual length that it is prolonged depends on the size of the velocity, preferably to its square. In addition or alternatively the actual length depends also on the transmission time and the processing time. Thus it can be taken care of delay times due to a later transmission into the real autonomous system, processing times of virtual as well as real element and a safety buffer can be installed.

According to a further embodiment the transmission time may comprise the time from the autonomous component or the object to its virtual image and back.

According to another embodiment the processing time may comprise the processing time in the autonomous component or the object or/and the processing time in the virtual image running on a computer.

The embodiments of the invention further relate to an autonomous system, a corresponding piece of software and a data carrier for storing said piece of software.

BRIEF DESCRIPTION

Figure 5:
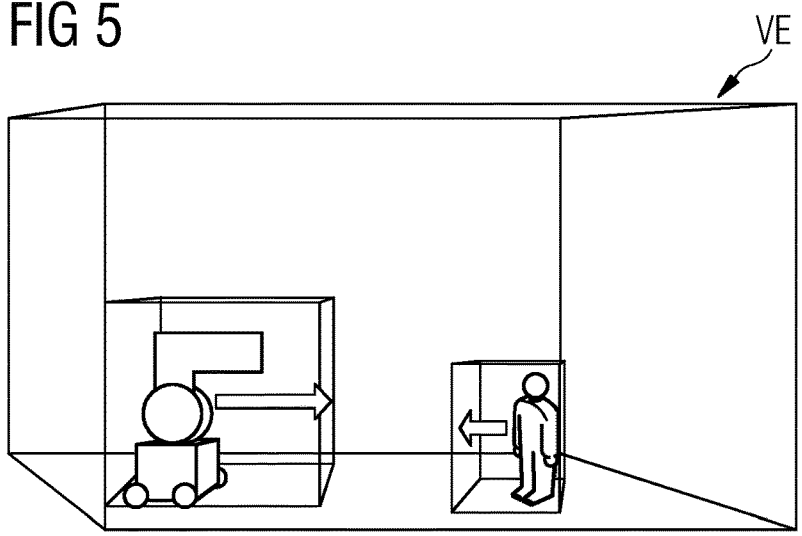
Figure 6:
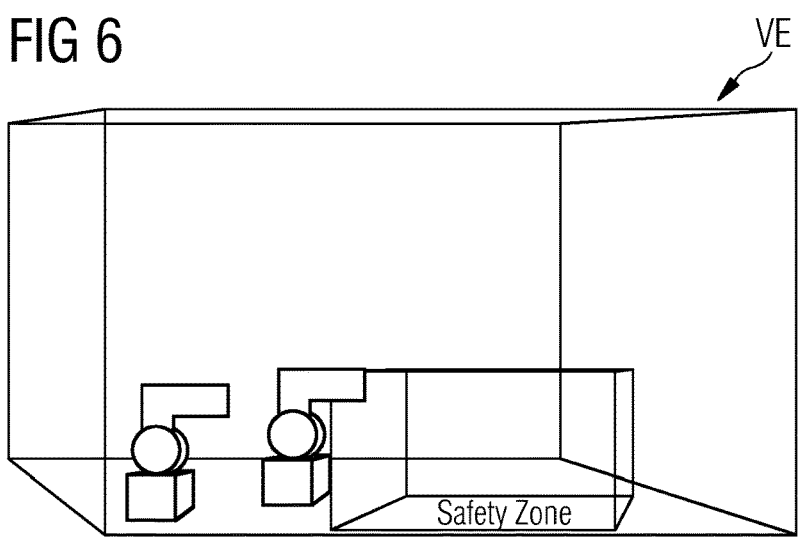
Figure 7:
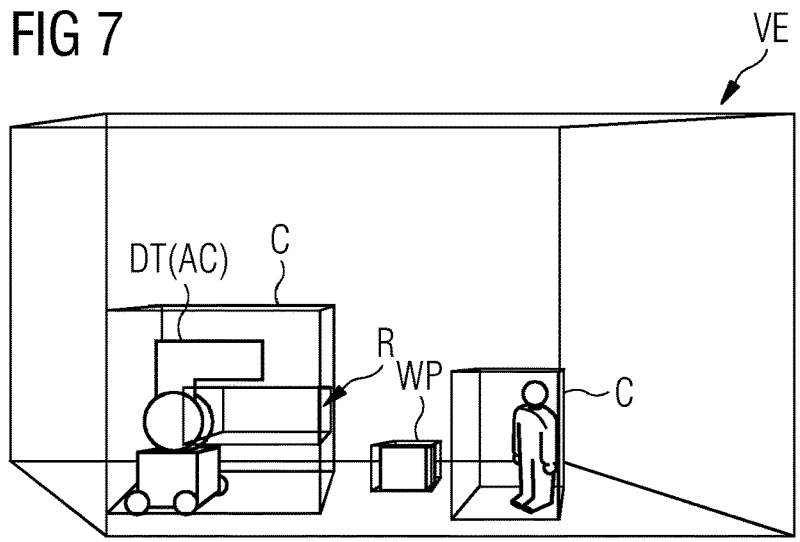
Figure 8:
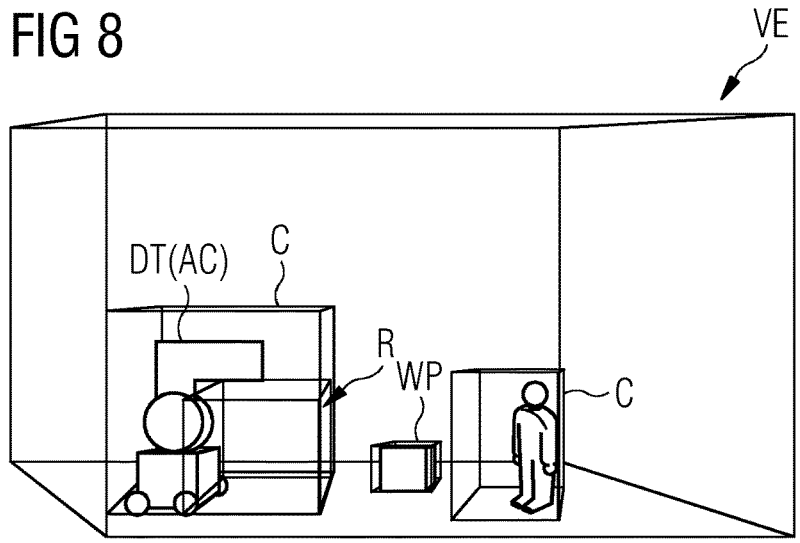
Figure 9:
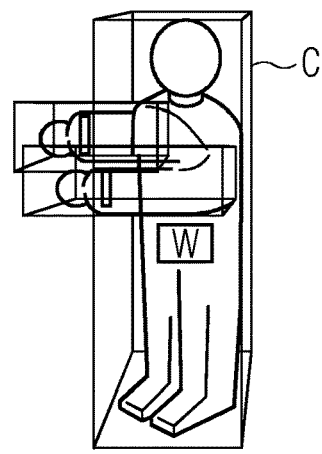

Some of the embodiments will be described in detail, with reference to the following figures, wherein like designations denote like members, wherein:

FIG. 1 a schematic graph of a real environment with autonomous components and a human coworker and a virtual environment representing a copy of the real environment exchanging data;

FIG. 2 a schematic graph of a section of an autonomous distributed production system;

FIG. 3 a schematic graph of a human operator surrounded by a box and wearing a location device;

FIG. 4 a schematic graph of a virtual image of a human operator surrounded by a box in the virtual environment with the digital image of the production system;

FIG. 5 a schematic graph of a virtual image of a human operator surrounded by a box extended in the direction of movement, moving towards an autonomous component in the virtual environment with the digital image of the production system;

FIG. 6 a schematic graph of two autonomous components and a safety zone in the virtual environment with the digital image of the production system;

FIG. 7 a schematic graph of a corpus around the virtual image of an autonomous object, said corpus having a recess to allow interaction, e.g. work piece handling, with a human coworker;

FIG. 8 a schematic graph as that of FIG. 7, where the recess is enlarged to facilitate interaction;

FIG. 9 a schematic graph showing a corpus suited for a human worker formed by a composition of boxes surrounding the torso and the extremities.

DETAILED DESCRIPTION

In the following description, various aspects of the present invention and embodiments thereof will be described. However, it will be understood by those skilled in the art that embodiments may be practiced with only some or all aspects thereof. For purposes of explanation, specific numbers, materials and configurations are set forth in order to provide a thorough understanding. However, it will also be apparent to those skilled in the art that the embodiments may be practiced without these specific details.

FIG. 1 depicts a real environment RE of a section of a production plant which is exchanging T data with a virtual environment VE reflecting the real environment or certain aspects thereof.

In the real environment RE there are autonomous components AC, AC' that interact with each other in order to realize a task, e.g. a production process. The autonomous components AC, AC' are e.g. robots that are adapted to perform a certain set of production tasks within a production process. The autonomous components AC, AC' are not centrally controlled but have a defined range of autonomy to make decisions.

The range of autonomy may depend on the specific production task, the actual constellation of the autonomous components AC, AC' etc.

Within the production plant there is further an object H, e.g. a human, which interacts with the autonomous components AC, AC'.

The interaction may be that the human H performs production tasks together with one or more autonomous components AC, AC' or that the human H is moving within the production plant.

The virtual environment VE is a virtual image of a real environment RE. The virtual image is running on an IT platform. This means in particular that a real environment RE is emulated with the help of a real computer such that a share of the real environment RE is reproduced virtually on that computer. This enables monitoring, supervision or testing of the real environment RE, e.g. an autonomous system without interfering, i.e. intervention into running operation.

The share of the autonomous system being reproduced depends on the objective of the virtualization, e.g. only a certain aspect or part may be virtualized for its optimization or testing.

Correspondingly, each element or only some of the elements of the real environment RE has a corresponding element in the virtual environment VE.

An element such as an autonomous component, e.g. a robot, has a plurality of sensors which produce sensor data.

A sensor may comprise a position detection sensor, a movement detection sensor, an acceleration sensor, a force sensor, a camera, an audio sensor, a smell sensor etc., a sensor detecting the presence of certain substances etc. Correspondingly, the sensor data may comprise position, e.g. spatial position, related data, velocity/acceleration or/and direction of movement/acceleration related data, data in relation to size and direction of a force, visual data, audio data, scent data, data in relation to existence and amount of certain substances etc.

Alternatively to the case where each element in the real environment RE has a corresponding element in the virtual environment VE, only certain elements of the real environment RE have a corresponding object in the virtual environment VE. This allows modeling, testing or surveillance of certain aspects of a production plant. This goal can also be achieved with an embodiment, where all the elements of the real environment RE may have a corresponding element in the virtual environment, but only data in regard to some elements are transferred from the real environment RE to the virtual environment VE or used for further computation in the virtual environment VE.

In the virtual environment VE the actual behavior of the elements in the real environment RE can be modeled with the help of the virtual or computerized representations of the real elements. As mentioned above, the virtual representations are sometimes referred to as digital twin.

With the help of these digital twins, e.g. the digital twins DT(AC), DT(AC') of the autonomous components, the production plant in the real environment RE can be modeled. The sensors of the real objects provide data which are transferred in a data transfer T into the virtual environment VE. There, with the help of a 3D modeling software the digital twin is usually made identical to the real object e.g. in shape but in particular in relation to actual state, e.g. position of a robot and position of its gripping arm, motion of the various constituents of the robot etc.

Therewith the future behavior of the autonomous components AC, AC' can be simulated and future situations, e.g. collisions can be determined. These simulation data are transferred back to the autonomous components AC, AC' as information, which they may use for decision making.

For the data transfer T between the real environment RE and the virtual environment VE various transfer modes can be used, such as wire-bound or wireless transfer methods or any combination thereof.

According to an advantageous embodiment there is a wireless connection, such as one according to an 802.11 standard from the autonomous components AC, AC' to a central transmitting entity in the real environment. From that central transmitting entity there is a wire-bound connection, e.g. an Ethernet connection.

Alternatively or additionally the data are transferred across wired connections to stationary autonomous components, such as conveyor belts or fixed robots.

Around the object, e.g. a human worker H a corpus C is generated in the virtual environment VE which leads to a zone which cannot be entered in the real environment RE. This zone is depicted for illustration purposes also as box in the real environment RE. Alternatively more than one box may be used to form the corpus C, e.g. to model body and arms of a human.

In FIG. 2 autonomous components AC, AC' in the real environment RE are depicted when performing the task of shifting a work piece WP in the form of a cube.

In FIG. 3 an object at risk, which is according to the embodiment shown there a human H, is depicted which may be moving in the real environment RE. For detecting its position he is equipped with a wearable detector W.

This wearable detector W may comprise GPS System or/and a gyroscope or/and a system for measuring propagation times or/and a camera, an infrared sensor, an ultra sound sensor etc.

Alternatively or additionally the object at risk may be one or more out of the autonomous objects.

For the embodiment described below the object at risk is considered as a human, but the exemplification are applicable for any other object at risk such as a, in particular delicate, robot, or any device used in production.

Around the object at risk, in particular a human, a corpus C is created in the virtual image, that encompasses the human. The corpus C may in particular have the form of a box, in particular a parallelepiped. This advantageously reduces the computational effort. Usually for 3D modeling triangles are used and thus any side of the box can be modeled with two triangles only.

This corpus C surrounds the human in the virtual environment VE depicted in FIG. 4. For the simulation of possible, i.e. not dangerous, movements in the real environment RE the corpus C is treated as a volume that no digital twin DT(AC), DT(AC') of an autonomous component may enter. Thus, for the digital twins DT(AC), DT(AC') allowed movements, i.e. movements not harming the human, can be determined in the virtual environment thereby having a safety buffer taking care of delays due to processing times, transmission times or inaccuracies in the position determination. Moreover, by adequate forming of the corpus C simple a reduction of the computational effort is achieved.

This information about the allowed movements is fed back into the real environment RE to the autonomous components AC, AC' that may need to use it, e.g. autonomous objects within a certain range to the place the information concerns. The autonomous components AC, AC' then consider this information when deciding autonomously on their further action.

As said above, the additional volumes safety measures can be implemented that account for inaccuracies of path or velocity determination as well as delay times occurring due to transfer between virtual and real environment or/and processing times etc.

The transfer of data from the real environment RE to the virtual environment VE, the computational tasks in the virtual environment VE, the feedback of the thus acquired information to real environment RE requires time. If the delay becomes too large there is the danger that a collision occurs before the autonomous components AC, AC' can actually use the feedback information, because they may not have received or/and processed it. To solve this problem, the corpus C is formed variably.

According to one embodiment the size of corpus C varies in relation to the hazard potential of the surrounding autonomous components.

According to another embodiment the size of the corpus C is calculated such that the path covered during the occurring communication delay or/and processing delay or/and is smaller than the corpus' dimensions. Thus, a future collision can be detected before it occurs and be avoided in spite of the delay as the feedback arrives in time.

Alternatively or additionally also inaccuracies are added to that dimensions of the corpus, e.g. the edges of a box are prolonged by these accuracies.

For avoiding a collision the autonomous component AC, AC' can decide on slowing down, stopping the respective movement, changing direction etc.

A human H may be warned of the possible collision by a signal displayed by the wearable, e.g. a blinking, a vibration alarm, sound etc.

In FIG. 5 an embodiment is depicted where the corpus C having the form of a box having edges parallel to the direction of movement and perpendicular thereto, i.e. a cuboid.

The box is enlarged in the direction of movement indicated by the respective arrow. This enlarging is done in relation to the velocity, i.e. for a higher velocity the edge parallel to the direction of movement becomes longer than for a lower velocity.

According to an advantageous embodiment the length of the edge is calculated in this way:

First, there is a basic box determined that offers sufficient space in all directions around the human in order to remain unharmed. Then, there is an additional edge length added in the direction of movement. This additional edge length is calculated such that the distance presumably covered during the travel time of the signal from the human or endangered object to the virtual entity and back plus the respective processing times is still inside the box. This estimate is done based on previous measurement values of velocity/direction and processing times.

In addition in FIG. 5, also the autonomous component AC is equipped with a box as surrounding corpus C. By using surrounding corpuses not only for the object at risk, in particular the human, the interconnection of the individual movements of the autonomous components and objects at risk can be considered more easily. Advantageously the edge length of both safety boxes is extended in the direction of movement.

In FIG. 6 a corpus in the virtual environment is depicted which is not associated with an object. Thus regions can be defined which are not to be entered by an autonomous object.

Thus, e.g. if an accident has occurred a certain space can be kept free.

In FIG. 7 an embodiment is depicted wherein in the corpus C around the virtual image of an autonomous component DT(AC), DT(AC') a recess R is formed. The volume within that recess is excluded from the volume of the corpus that cannot be entered. Additional rules may be applied for the volume of the recess R, e.g. that the recess volume may be entered generally or be entered by certain objects, e.g. only by humans.

According to a further embodiment a corpus C is defined differently for different (digital twins of) objects, e.g. there is a corpus type for human actors, a further corpus type for cyber physical components, a corpus type for work pieces or a corpus type for safety zones. Having made this distinction, a finer set of rules can be defined, in order to allow interactions in the course of the production process but still ensure the safety of humans and components.

According to an exemplary set of rules no collisions may be allowed between humans and cyber physical components, in between work pieces, between cyber physical components and safety zones, in between cyber physical components.

"Collisions" or rather interactions may be allowed between humans or cyber physical components and work pieces.

Thus, interaction or/and contact necessary in the production process is possible in small, defined corridors. Thereby still dangerous collisions can be avoided.

According to FIG. 8 the recess is enlarged to facilitate the handling of a work piece WP, in particular when a set of rules for intrusion as above is used. Thus, e.g. a large corridor may be defined to enable an easy handling whilst still ensuring that no dangerous collision happens.

In FIG. 9 a human H is depicted which is wearing a detector for position determination. Based on these detector data in the virtual environment VE a corpus C attached to the human can be generated. In the depicted example the corpus C is formed by a plurality of boxes surrounding the body and the arms. The number of boxes used for forming the corpus C is depending on the working environment and the duties of the human coworker.

Although the present invention has been described in accordance with preferred embodiments, it is obvious for the person skilled in the art that modifications or combination between the embodiments, fully or in one or more aspects, are possible in all embodiments.

Parts of the description have been presented in terms of operations performed by a computer system, using terms such as data and the like, consistent with the manner commonly employed by those skilled in the art to convey the substance of their work to others skilled in the art. As is well understood by those skilled in the art, these quantities take the form of electrical, magnetic, or optical signals capable of being stored, transferred, combined, and otherwise manipulated through mechanical and electrical components of the computer system; and the term computer system includes general purpose as well as special purpose data processing machines, routers, bridges, switches, and the like, that are standalone, adjunct or embedded.

Additionally, various operations will be described as multiple discrete steps in turn in a manner that is helpful in understanding the present embodiments of the invention. However, the order of description should not be construed as to imply that these operations are necessarily order dependent, in particular, the order of their presentation.

Although the invention has been illustrated and described in greater detail with reference to the preferred exemplary embodiment, the invention is not limited to the examples disclosed, and further variations can be inferred by a person skilled in the art, without departing from the scope of protection of the invention.

For the sake of clarity, it is to be understood that the use of "a" or "an" throughout this application does not exclude a plurality, and "comprising" does not exclude other steps or elements.

The invention claimed is:

1. A method for detecting an imminent collision between an object and a component of an autonomous system in a real environment comprising at least one real, decentralized autonomous component, whereby of at least a part of the autonomous system a virtual image is available, emulating at least one aspect of the autonomous system, the method comprising:

a) transferring data to the virtual image of the autonomous system, the data comprising: component data providing information in relation to a movement of the at least one real autonomous component and object data providing information in relation to a movement of the object;

b) generating, in the virtual image, a corpus around the virtual image of the object based on a spatial position of the object from a wearable detector attached to the object, which defines a volume that cannot be entered by the virtual image of the at least one autonomous component wherein the object is a human being and the corpus around the virtual image of the human being is formed by more than one parallelepiped box to model a body and arms of the human, each by one separate parallelepiped box;

c) processing the component data and the object data in the virtual image and generating feedback data providing information about movements of the virtual images of the object and the autonomous component; and d) transferring feedback data from the virtual image of the autonomous system to the real autonomous component for use by the autonomous component when deciding about a further movement.

2. The method according to claim 1, further comprising e) acting, of the real autonomous component, whereby the feedback data are considered, whereby the acting comprises changing a movement, such that the real autonomous component does not collide with the object.

3. The method according to claim 1, wherein a corpus is created also around the at least one autonomous component.

4. The method according to claim 1, wherein the component data comprise sensor data from sensors on or/and at the at least one autonomous component or/and in or/and at the premises of the autonomous system.

5. The method according to claim 1 wherein the component data comprise data from models of at least a part of the autonomous system or/and the relative position of a component to another component or the object.

6. The method according to claim 1 wherein at least one of the corpuses is a box.

7. The method according to claim 1 wherein the corpus around the at least one the object or/and at least one component is variable in dependence on the size of velocity or/and direction of velocity or/and the existence of further autonomous components.

8. The method according to claim 7, wherein for the existence of further autonomous components the number of autonomous components within a predefined section of the autonomous system or/and a type of the autonomous components is considered.

9. The method according to claim 8, whereby a hazardous potential is determined dependent on at least one of:
a size or/and type of the autonomous components
a range of possible movements
a velocity range
a direction or/and size of acceleration; and
a weight of a moving part of the autonomous component.

10. The method according to claim 7 wherein the corpus is a box having edges parallel to the direction of movement and edges perpendicular thereto and the edges of the box parallel to the direction of movement are prolonged by at least one of the distances:
the distance covered by the object during the delay time due to the transmissions between the autonomous system and the virtual image;

the distance covered by the object during the processing time of at least one of
   autonomous component
   virtual image of the autonomous component, DT;
an inaccuracy of the position determination;
a distance determined by taking a velocity inaccuracy times delay or/and processing times; and
at least one distance determined by a velocity of an autonomous component in a vicinity radius around the object.

11. The method according to claim 1, wherein the object is a human being equipped with the wearable detector for determining the spatial position, and wherein in the virtual environment the corpus is generated depending on object data stemming from the wearable detector.

12. The method according to claim 1, wherein a transmission interface is provided for transmitting the position data.

13. The method according to claim 1, wherein the corpus is formed such that the corpus comprises at least one recess the volume within such recess being excluded from the volume of the corpus that is not allowed to be entered.

14. The method according to claim 13, wherein for excluded volume rules for access are installed depending on the object, that the excluded volume is allowed to be entered or/and allowed to be entered only by the object or/and the work piece.

15. An autonomous system for use in production, comprising at least one autonomous component and at least one object at risk, wherein for an avoidance of collisions the method according to claim 1 is performed.

16. A computer program product comprising a non-transitory computer readable storage medium containing instructions which, when executed by a computer, causes the computer to perform method according to claim 1.

17. A non-transitory computer readable storage medium comprising instructions that when executed by a computer, causes the computer to perform the method of claim 1.

* * * * *